April 5, 1960
J. GILBERT
2,931,406
AUTOMATIC LOCKING, DETACHABLE CARRIAGE
FOR FOOD SLICING MACHINES
Filed Feb. 11, 1957
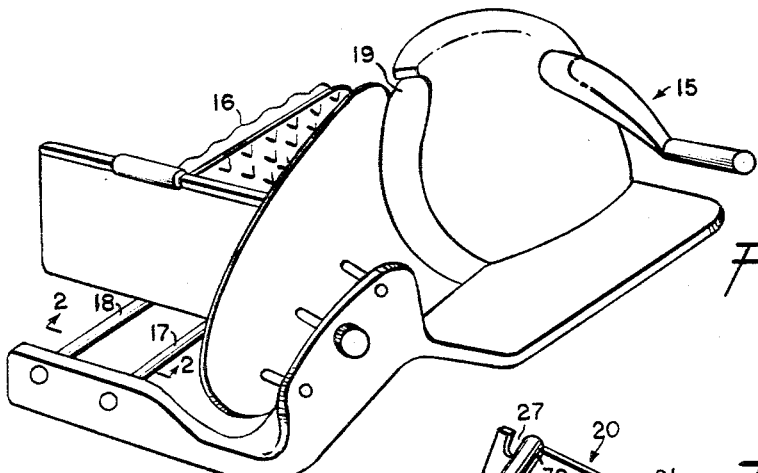
Fig.1
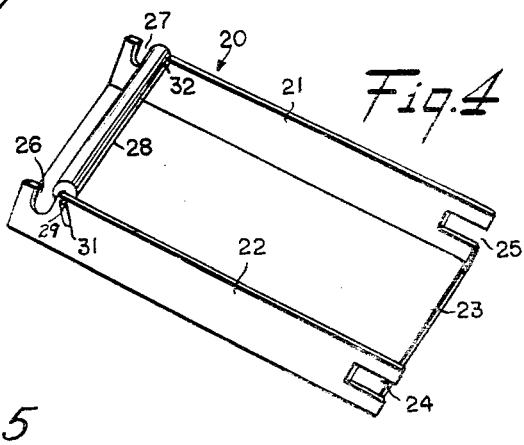
Fig.4
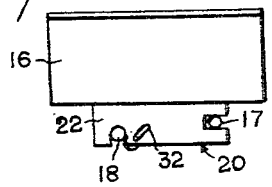
Fig.2
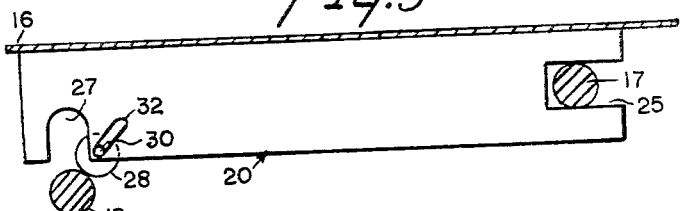
Fig.5
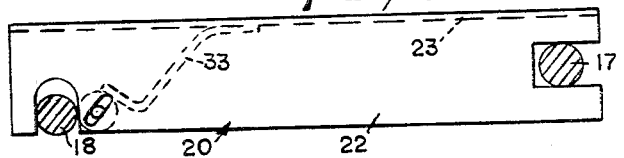
Fig.6
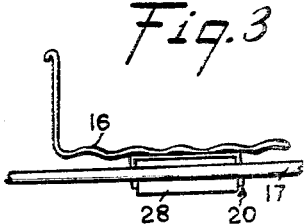
Fig.3
Fig.7
INVENTOR.
JACK GILBERT
BY
ATTORNEY.

United States Patent Office 2,931,406
Patented Apr. 5, 1960

2,931,406

AUTOMATIC LOCKING, DETACHABLE CARRIAGE FOR FOOD SLICING MACHINES

Jack Gilbert, Newburgh, N.Y., assignor to General Slicing Machine Co., Inc., Walden, N.Y., a corporation of New York Application February 11, 1957, Serial No. 639,252

16 Claims. (Cl. 146—102)

The present invention relates to food slicing machines of the type having a slidably mounted carriage on track rods along which it is moved to and fro past a cutting blade.

An object of this invention is to provide the food carriage with novel and improved structure which affords easy removal of the carriage so that it could be cleaned and then easily remounted for use.

A further object is to provide a novel and improved means on the carriage which permits detachment of the carriage from the track rods and which serves as a slide bearing therefor besides releasable locking mechanism.

Another object is to provide novel and improved detachment means on the carriage which automatically locks the carriage against removal from the track rods when such carriage is merely set on said rods.

Still a further object thereof is to provide a detachable carriage of the character described, which is easy to mount and demount, reasonably cheap to manufacture and which is efficient in carrying out the purposes for which it is designed.

Other objects and advantages will become apparent as this disclosure proceeds.

One form this invention may assume is to have a food slicing machine with two spaced round rods serving as the track along which the food carriage is slidable. On the underside of the carriage there is say, an inverted channel positioned across said rods and presenting its side walls extending downwardly. One of said track rods extends through a notch in one side end of each of said opposite channel walls. The other track rod extends through a notch in the free longitudinal edge of each of opposite channel walls. There is a round rod piece positioned longitudinally tangent to the last mentioned track rod, between said opposite channel walls, obstructing the exit of such track rod from the notches it extends through. Such notches and rod piece serve as a slide bearing for the carriage. At each end of said rod piece, there is a pintle extending through a track slot in the opposite channel walls respectively. These slots slant towards the entrances to said notches near said rod piece. This rod piece is manually movable upwardly to clear the track rod it engages, thus permitting removal of the carriage. Depending upon the position of the track rods, it may be necessary to provide spring means to properly bias the rod piece to latching position.

A more detailed description of structure and the mode of operation will now be given.

In the accompanying drawing forming part of this specification, similar characters of reference indicate corresponding parts in all the views.

Fig. 1 is a perspective view of a food slicing machine embodying the teachings of this invention.

Fig. 2 is a section taken at lines 2—2 in Fig. 1.

Fig. 3 is a partial side view of Fig. 2.

Fig. 4 is an enlarged perspective view of the channel member shown inverted with respect to its position on the machine, in order to obtain good illustration of the rod piece associated therewith to serve as part of a slide bearing and act as the latch to hold the carriage against removal from the track rods.

Figs. 5-7 are magnified views of the lower portion of Fig. 2, showing the progressive steps in mounting the carriage onto the track rods. In reverse order, they show the progressive steps in removing the carriage.

In the drawing showing one form this invention may assume, the numeral 15 designates generally a food slicing machine whose food carriage 16 is mounted on the round track rods 17, 18 for sliding movement therealong, to and fro past the rotary disc cutting blade 19. An inverted channel indicated generally as 20, extends downwardly from the underside of the carriage. The side walls 21, 22 of said channel are perpendicular to its floor wall 23 which is secured to the undersurface of the carriage 16. The numerals 24, 25 denote notches in the side edges of the opposite side walls of the channel, through which fits the track rod 17. In the embodiment shown, such track rod is the one nearest the blade 19. The numerals 26, 27 indicate notches in the free longitudinal edges of the side walls 21, 22 respectively, through which fits the track rod 18. The notches for each track rod are of course aligned. The crotch of each of the notches 26, 27 is semi-circular and bears on the track rod 18 when the carriage 16 is mounted for operation. There is a rod piece 28 between and in contact with the inner surfaces of the channel's opposite side walls 21, 22. This rod piece is parallel to and tangent longitudinally with the track bar 18. This rod piece 28 blocks the exit of the track rod 18 from the notches 26, 27 and with such notches, forms a slide bearing for the carriage on said track rod 18. The track rods and said rod piece are horizontal or substantially so. At each end of the rod piece there is a pintle extending through a track slot in a channel side wall. These pintles are indicated by numerals 29, 30 and the track slots by the numerals 31, 32 respectively. Said pintles are coaxial with the rod piece 28. Said track slots are in alignment and extend sloped downwardly towards the respective entrances to the notches 26, 27.

When the carriage 16 is in condition for use, the pintles 29, 30 are at the lower ends of their track slots, at which position, the rod piece 28 acts as a latch, locking the carriage to the track rods 17, 18 and is in sliding contact with the track rod 18 and together with the notches 26, 27, forms a slide bearing for the carriage on such track rod 18. The said notches 26, 27 may be deemed an open slide bearing for the track rod 18, which becomes a closed slide bearing when the rod piece 28 locks the carriage to said track rod. The direction of the track slots 31, 32 is such that the rod piece 28 remains tangent to the track rod 18 along the underside of said track rod up to the horizontal diametral plane through such track rod, at which latter position of the rod piece to which it is brought by being lifted manually, the carriage 16 becomes free for removal from the track rod 18, and hence from the track rod 17. Fig. 7 shows the carriage in use position on the machine 15; the rod piece 28 locking it in place against removal. Fig. 6 shows the rod piece 28 raised to permit removal of the carriage. When the carriage is taken off the track rod 18, as shown in Fig. 5, the rod piece 28 automatically falls to its lowest position upon release of hold thereon.

To replace the carriage 16, place it so that the track rod 17 is entered through the notches 24, 25 as shown in Fig. 5. Then move the carriage so that the track rod 18 shall enter the notches 26, 27 which action will automatically cause the rod piece 28 to be lifted by said track rod 18 to permit such entrance. When said track rod sets for slide fit in the notches 26, 27, the rod piece 28 by action of gravity, will automatically fall to its lowest position as in Fig. 7, whereupon said rod piece serves in its dual function of latch and slide bearing. If desired, a blade spring 33 may be provided as shown in Fig. 6, to act against the bar piece 28 to bias it towards latching position. This is not required when the track bars are horizontal, because gravity may be relied on to return the bar piece 28 to use position. Without further illustration, it is understandable to those versed in the machine art that the track rods 17, 18 may lie in a plane other than horizontal and that this invention is readily adaptable where there is only one track rod of non-circular cross section supporting the carriage.

This invention is capable of numerous forms and various applications without departing from the essential features herein disclosed. It is therefore intended and desired that the showing herein shall be deemed illustrative and not restrictive and that the patent shall cover all patentable novelty herein set forth; reference being had to the following claims rather than to the specific description herein to indicate the scope of this invention.

I claim:

1. In a food slicing machine having a food-carrying member, a frame and a track rod mounted on the frame, an open slide-bearing mounted on the food-carrying member, positioned on said track rod, slidable therealong, laterally removable therefrom and laterally replaceable thereonto, a rod piece in sliding contact with the track rod for movement along the track rod and positioned whereby it blocks the removal of the said open bearing in a direction lateral of the track rod and a track carried along with the food-carrying member; said rod piece being engaged in said track and positioned at one end of same; said track being such that said rod piece is manually movable laterally therealong in a direction away from the entrance of said open slide bearing to free said bearing for removal from the track rod in a direction lateral to such track rod and said rod piece is likewise moved automatically upon contact with said track rod when said bearing is being reset on said track rod, to allow such bearing to be reset on such track rod; said entrance being that through which the track rod leaves said slide bearing upon removal of such slide bearing from said track rod and through which said track rod enters said slide bearing upon resetting such bearing on said track rod and means biasing the rod piece towards said end of its track.

2. The article as defined in claim 1, wherein said means is the force of gravity.

3. The article as defined in claim 1, wherein said means is a spring carried along with the food-carrying member.

4. The article as defined in claim 1, wherein the rod piece is elongated.

5. The article as defined in claim 1, wherein the rod piece is elongated and the track therefor comprises two parts which are identical; the ends of said rod piece being engaged at corresponding ends of said track parts.

6. The article as defined in claim 5, wherein the rod piece is of round cross section and is rotatable about its longitudinal axis in the track.

7. The article as defined in claim 6, wherein the track rod is of round cross section and means on the frame holding the slide bearing against rotary movement about the track rod.

8. The article as defined in claim 1, wherein the rod piece is of round cross section and is rotatable about its axis in the track.

9. The article as defined in claim 8, wherein the track rod is of round cross section and means on the frame holding the slide bearing against rotary movement about the track rod.

10. The article as defined in claim 1, wherein the open slide bearing comprises a pair of elements extending from the food-carrying member in spaced relation along the track rod; each of said elements having a notch; said notches extending in the same direction and opposite each other; the track rod being positioned through said notches and in contact with its edges and wherein the rod piece is elongated and extends between and substantially to said elements and wherein the track for the rod piece comprises two parts which are identical; said parts being on said elements respectively; the ends of said rod piece being engaged at corresponding ends of said track parts.

11. The article as defined in claim 10, wherein the rod-piece is of round cross section and is rotatable about its longitudinal axis in its track parts.

12. The article as defined in claim 10, wherein the track rod is of round cross section and means on the frame holding the food-carrying member against rotary movement about the track rod.

13. The article as defined in claim 10, wherein the track rod is substantially horizontal.

14. The article as defined in claim 13, wherein the track for the rod piece extends upwardly from the entrances of the notches.

15. The article as defined in claim 1, wherein the rod piece is of round cross section and rotatable about its axis in the track therefor and wherein the track rod is substantially horizontal and said track for the rod piece extends upwardly from the mentioned entrance.

16. The article as defined in claim 15, wherein the slide bearing is moved in an upward direction to remove it from the track rod.

References Cited in the file of this patent

UNITED STATES PATENTS

| | | |
|---|---|---|
| 2,431,390 | Folk | Nov. 25, 1947 |
| 2,592,843 | Andrews | Apr. 15, 1952 |
| 2,631,465 | Cordis | Mar. 17, 1953 |
| 2,807,301 | Gilbert et al. | Sept. 24, 1957 |